United States Patent
Zhang et al.

(10) Patent No.: US 8,953,939 B2
(45) Date of Patent: Feb. 10, 2015

(54) VARIABLE BIT-RATE QPSK TRANSMITTER AND METHOD EMPLOYING POLARIZATION MANIPULATION

(71) Applicant: NEC Laboratories America, Inc., Princeton, NJ (US)

(72) Inventors: Shaoliang Zhang, Princeton, NJ (US); Dayou Qian, Princeton, NJ (US); Junqiang Hu, Princeton, NJ (US); Lei Xu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 147 days.

(21) Appl. No.: 13/667,708

(22) Filed: Nov. 2, 2012

(65) Prior Publication Data

US 2013/0108270 A1 May 2, 2013

Related U.S. Application Data

(60) Provisional application No. 61/554,731, filed on Nov. 2, 2011.

(51) Int. Cl.
*H04J 14/06* (2006.01)
*H04B 10/04* (2006.01)
*H04B 10/12* (2006.01)
*H04B 10/50* (2013.01)

(52) U.S. Cl.
CPC ............ *H04J 14/06* (2013.01); *H04B 10/5055* (2013.01)
USPC .............................................. 398/65; 398/184

(58) Field of Classification Search
CPC .. H04B 10/5053; H04B 10/5052; H04J 14/06
See application file for complete search history.

(56) References Cited

U.S. PATENT DOCUMENTS

2011/0170869 A1* 7/2011 Mandai et al. .................. 398/65

OTHER PUBLICATIONS

Pfau et al. (Polarization-Multiplexed 2.8 Gbit/s Synchronous QPSK Transmission with Real-Time Digital Polarization Tracking Univ. Paderborn, EIM-E, 2007).*

* cited by examiner

*Primary Examiner* — M. R. Sedighian
*Assistant Examiner* — Mina Shalaby
(74) *Attorney, Agent, or Firm* — Joseph Kolodka

(57) ABSTRACT

Disclosed are universal QPSK transmitter structures and methods for generating different QPSK signals exhibiting different polarization schemes, namely PolMux, PolMod and PolSw. The bit rate of the generated signals is variable, thereby allowing the transmitter to adjust to varying network traffic conditions. Advantageously, the generated signals may be detected by analog receivers (PolSw-QPSK) and coherent receivers (PolMux-QPSK, PolMod-QPSK, and PolSw-QPSK).

3 Claims, 7 Drawing Sheets

VARIABLE BIT-RATE QPSK TRANSMITTER AND METHOD EMPLOYING POLARIZATION MANIPULATION

TECHNICAL FIELD

This disclosure relates generally to the field of optical communications and in particular to a method and apparatus for the universal generation of quadrature phase shift keying (QPSK) signals with three polarization schemes such that a variable bit rate is realized.

BACKGROUND

As data rates exhibited by optical transmission systems continue to rise it is expected that data traffic rates may vary from 10 Gb/s to 1 Tb/s and above due, in part, to the demand for a variety of Internet services. To transmit this data efficiently using limited bandwith, flexible transponders exhibiting agile modulation format(s) and variable bit rates have been introduced.

It is generally known in the art that the QPSK is but one contemporary modulation format exhibiting increased transmission distance and spectral efficiency (SE). In addition to the QPSK modulation format, different polarization schemes have been applied such that polarization multiplexed (PolMux-QPSK), polarization modulated (PolMod-QPSK) and polarization switched (PolSw-QPSK) signals have been produced, which offer numerous benefits.

SUMMARY

An advance in the art is made according to an aspect of the present disclosure directed to structures and methods that produce PolMux-QPSK, PolMod-QPSK, and PolSw-QPSK with variable bit rate.

Viewed from a first aspect, the present disclosure is directed to a universal QPSK transmitter structures and methods capable of generate different QPSK signals exhibiting different polarization schemes, namely PolMux, PolMod and PolSw. Additionally, the bit rate of the generated signals is variable, thereby allowing the transmitter to adjust to varying network traffic conditions. Advantageously, the generated signals may be detected by analog receivers (PolSw-QPSK) and coherent receivers (PolMux-QPSK, PolMod-QPSK, and PolSw-QPSK).

BRIEF DESCRIPTION OF THE DRAWING

A more complete understanding of the present disclosure may be realized by reference to the accompanying drawings in which.

DETAILED DESCRIPTION

Figure 1:
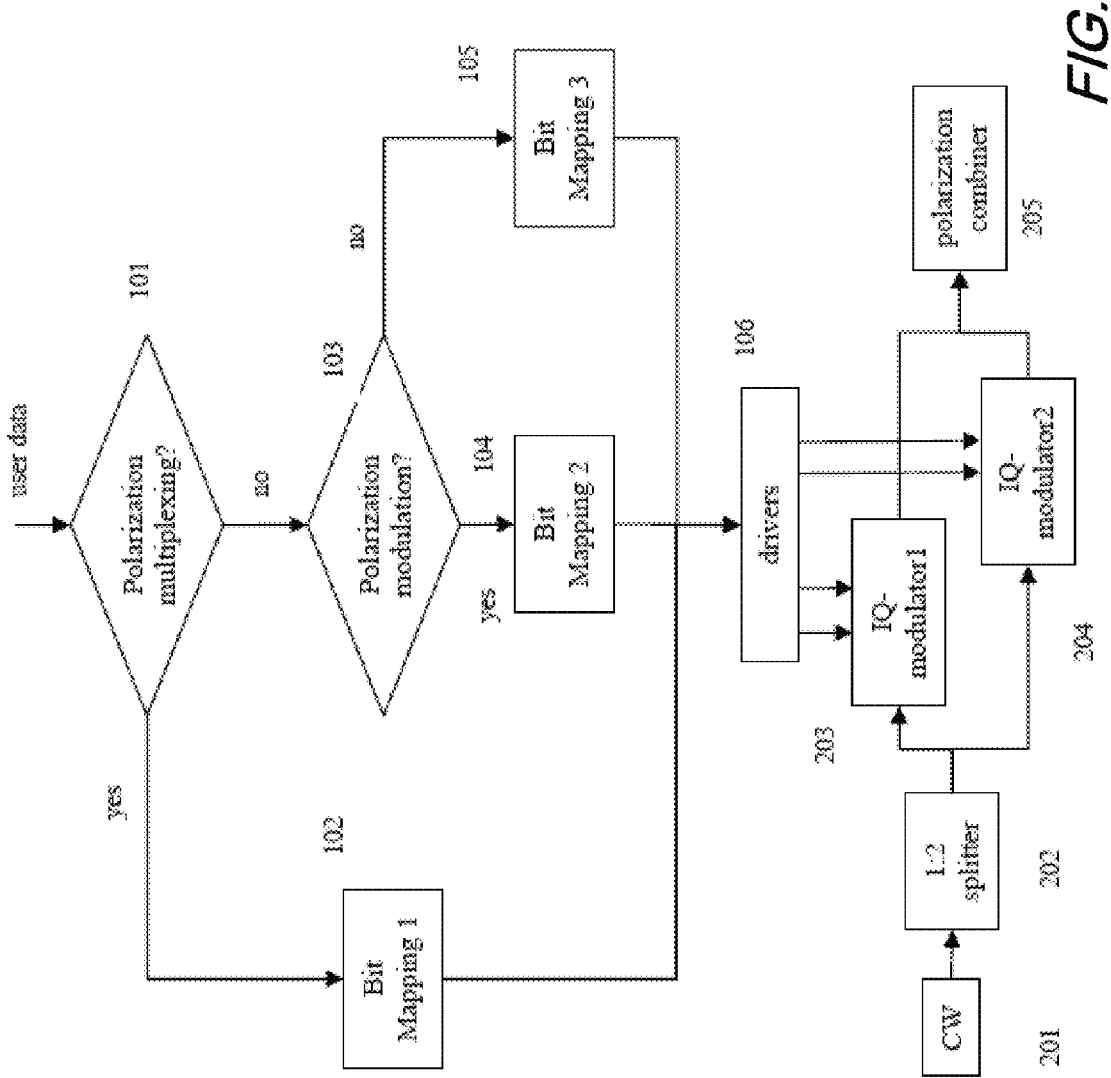
FIG. 1 is a schematic block diagram depicting an exemplary variable-bit-rate QPSK transmitter according to an aspect of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

INTRODUCTION

By way of some additional background, we note that alternative approaches have been employed to generate QPSK signals. Of interest is an approach described by M. Eiselt, B. Teipen, K. Grobe, A. Autenreith, and J. Elbers in a paper entitled "Programmable Modulation for High-Capacity Networks" that was presented at the 37$^{th}$ European Conference and Exposition on Optical Communications and appeared in the OSA Technical Digest (CD) published by the Optical Society of America in 2011 and was paper Tu.5.A.5. The approach described therein included a cascade of modulators and a digital to analog converter to generate different modulation formats. Another approach of interest was a paper by H. Takara, T. Goh, K. Shibahara, K. Yonenaga, S. Kawai and M. Jino entitled "Experimental Demonstration of 400 Gb/s Multi-flow, Multi-rate, Multi-reach Optical Transmitter for Efficient Elastic Spectral Rouging," that was presented at the 37th European Conference and Exposition on Optical Communications, and appeared in the OSA Technical Digest (CD) published by the Optical Society of America in 2011 as paper Tu.5.A.4. This latter approach employed multi-tone lasers and IQ-modulators to generate different modulation formats and superchannels for a flexible bit rate and multi-flow transponder.

FIG. 1 is a hybrid schematic diagram depicting both the steps associated with the selection of an appropriate bit mapping, and the block diagram of a variable bit rate QPSK transmitter according to aspects of the present disclosure. More particularly, FIG. 1 depicts an overall process/structure for generating variable-bit-rate QPSK using different polarization schemes, including polarization multiplexing (PolMux), polarization modulation (PolMod), and polarization switching (PolSw).

As depicted in that FIG. 1, user data is received at block 101 and if polarization multiplexing is to be employed, then Bit mapping 1 is made at block 102. Similarly, if polarization multiplexing is not to be employed, then a determination is made at block 103 whether polarization modulation is to be employed. If polarization modulation is to be employed, then Bit mapping 2 is made at block 104. If neither polarization multiplexing or polarization modulation is to be employed, then Bit mapping 3 is made at block 105.

The Bit mapped data is applied to drivers at block 106 the outputs of which are provided to IQ-modulator 1 (block 203) and IQ-modulator 2 respectively. As depicted in this FIG. 1, an output of a CW laser (block 201) is applied to a 1:2 splitter (block 202) the outputs of which are applied to the two modulators namely, IQ-modulator 1 and IQ-modulator 2. The outputs of the two modulators are applied to polarization combiner (block 205) such that a desired QPSK output format is generated.

Figure 2:
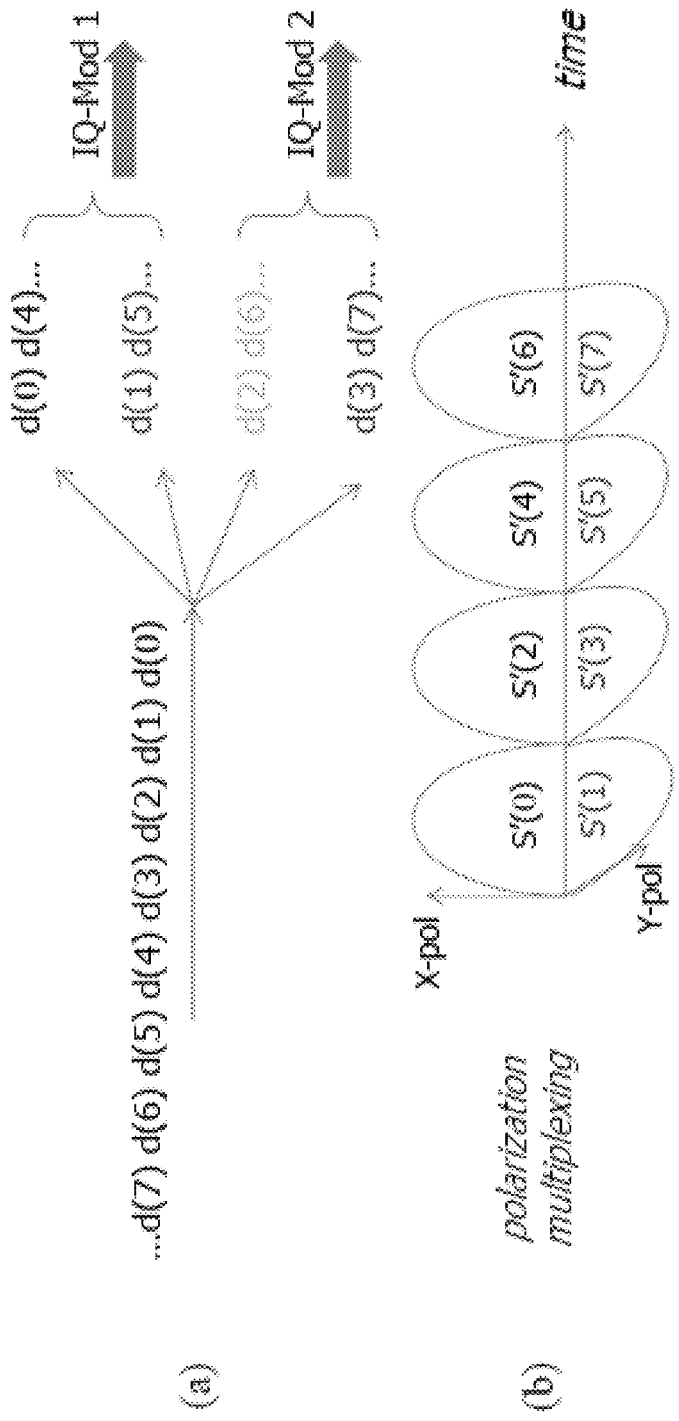
FIG. 2 depicts bit mapping 2(a) for producing polarization multiplexed QPSK signals according to aspects of the present disclosure and 2(b) depicts a waveform of PolMux-QPSK signals according to an aspect of the present disclosure.

As may be appreciated, if both polarization states (x and y) carry data (QPSK symbols), the user data are fed into block 102 to perform bit mapping 1—which is shown schematically by FIG. 2(a) according to an aspect of the present disclosure. The mapping generates QPSK symbols in each polarization, thus resulting in 4 Rs bit rate in total, where Rs is clock rate of the bit generator. As depicted in FIG. 2(b) and according to yet another aspect of the present disclosure, the waveform of the PolMux QPSK signal as generated is depicted.

Figure 3:
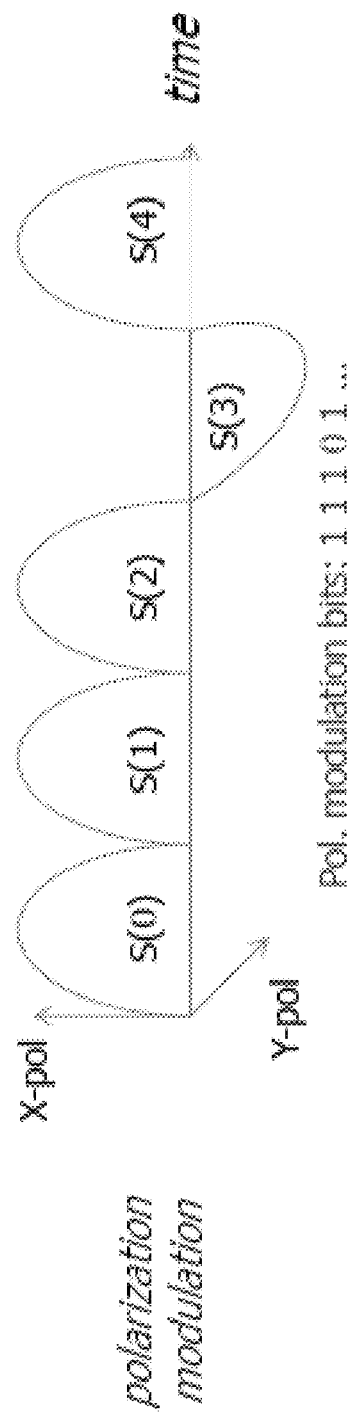
FIG. 3 depicts a waveform of a polarization-modulated QPSK signal according to an aspect of the present disclosure.

Turning now to FIG. 3, there is depicted a schematic of the waveform of a polarization-modulated QPSK signal according to an aspect of the present disclosure. As will now be appreciated by those skilled in the art, to utilize the polarization for carrying data, the polarization state in which a QPSK symbol locates is determined by polarization bits. This is known in the art as polarization modulated signals. As illustrated in FIG. 3, a polarization modulation bit "1" represents data in x-polarization state while a polarization modulation bit "0" represents data in the other, y-polarization state.

As may be further appreciated by those skilled in the art, the nomenclature we employ namely $\vec{E}_x$ and $\vec{E}_y$ stand for the signals in two polarization states. Therefore, a polarization modulated (PolMod) signal at each time interval can be expressed as either $\{\vec{E}_x, 0\}$ or $\{\vec{E}_y, 0\}$, since data is carried in one polarization state only.

Figure 4:
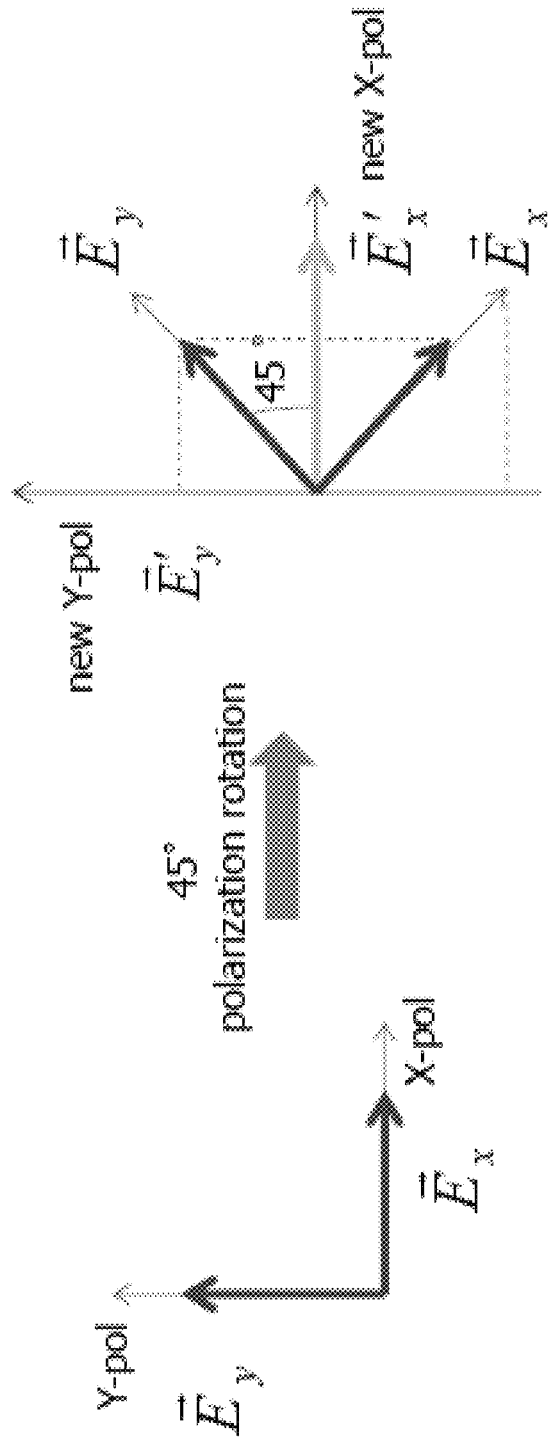
FIG. 4 depicts an alternative way to represent signals having two polarization states according to an aspect of the present disclosure.

Viewed from another aspect, a PolMod signal polarization may be rotated by 45° without affecting performance. Turning now to FIG. 4, there is shown an alternative method to represent signals with two polarization states according to yet another aspect of the present disclosure. As depicted in that FIG. 4, the signals located in a new axis are the combination of two original polarization states: $\vec{E'}_x \propto \vec{E}_x + \vec{E}_y$ and $\vec{E'}_x \propto \vec{E}_x - \vec{E}_y$. As a result, the expression for the PolMod signals could be a set of $\{\vec{E}_x, \vec{E}_x\}$ and $\{\vec{E}_y, -\vec{E}_y\}$. Note that only one polarization has a signal at each time. Assuming that the QPSK symbols are $\{\pm 1 \pm j\}$, therefore the inphase and quadrature of PolMod QPSK symbols are listed in Table 1.

TABLE 1

|  |  | X-Pol | | Y-Pol | |
|---|---|---|---|---|---|
|  |  | Inphase | Quadrature | Inphase | Quadrature |
| X-Pol | 1 | 1 | 1 | 1 | 1 |
| X-Pol | 2 | 1 | −1 | 1 | −1 |
| X-Pol | 3 | −1 | 1 | −1 | 1 |
| X-Pol | 4 | −1 | −1 | −1 | −1 |
| Y-Pol | 5 | 1 | 1 | −1 | −1 |
| Y-Pol | 6 | 1 | −1 | −1 | 1 |
| Y-Pol | 7 | −1 | 1 | 1 | −1 |
| Y-Pol | 8 | −1 | −1 | 1 | 1 |

As may be observed from Table 1, when data is carried in an X-polarization, the inphase and quadrature of Y-pol is the same as X-polarization. On the other hand, the inphase and quadrature of Y-polarization is the inverse of those in X-polarization when data is located in Y-polarization.

Figure 5:
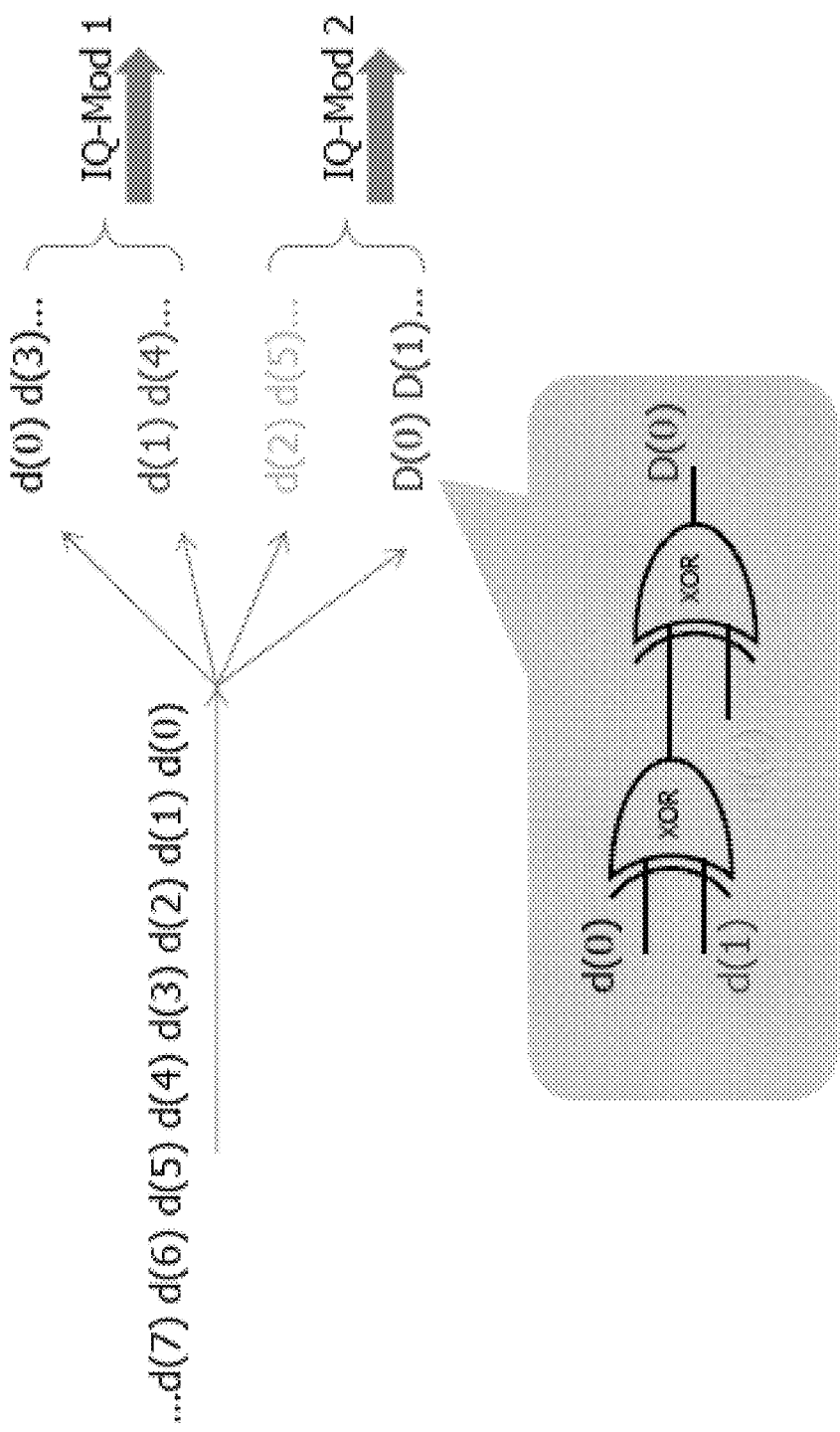
FIG. 5 depicts bit mapping 2 for PolMod-QPSK according to the present disclosure.

Overall, the inputs to both IQ-modulators, (blocks 203 and 204) should follow this rule namely: the exclusive OR (XOR) gate of all of the inputs equal 0. Therefore, to generate PolMod signals, the bit mapping 2 (block 104) as described in FIG. 5 is employed. Advantageously, such a mapping results in the quadrature and in-phase bits of both polarization states as shown in Table 1.

According to an aspect of the present disclosure, the inputs to IQ-Mod1 (block 203) and the inphase of IQ-Mod2 (block 204) are the user bits, while the quadrature of IQ-Mod2 (block 204) is the output of XOR gate between these three data, i.e, D(0)=d(0) XOR d(1) XOR d(2). As may be observed, only three user bits are used for generating each PolMod QPSK symbol, thus resulting in 3 Rs bit rate.

Figure 6:
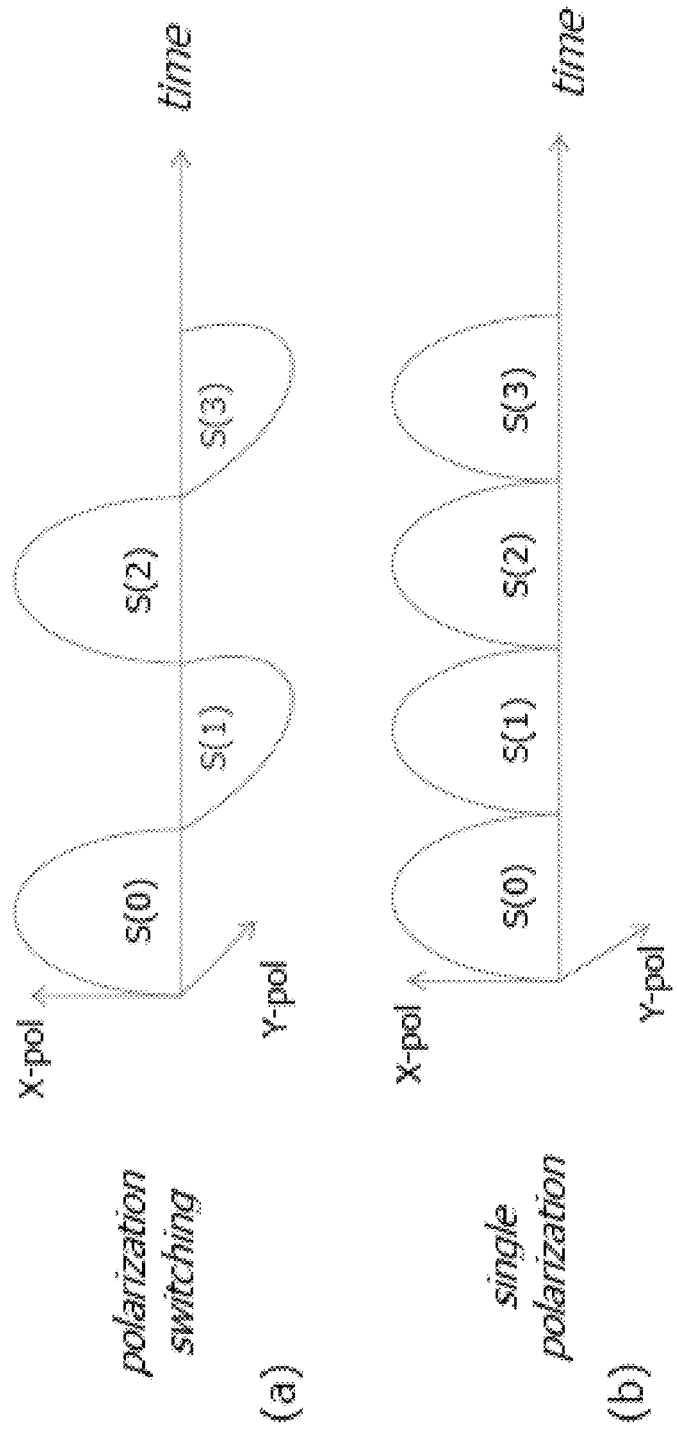
FIG. 6 depicts polarization switching 6(a) and 6(b) depicts single polarization scheme(s) according to aspects of the present disclosure.

In contrast to the PolMod-QPSK signal, the polarization of PolSw signal alternates between adjacent two symbols, as shown in FIG. 6(a). With reference to FIG. 6(a) and FIG. 6(b), there is shown the x-pol and y-pol vs. time for both a polarization switching (FIG. 6(a)) and single polarization scheme (s) (FIG. 6(b)).

As may be appreciated, on advantage of techniques according to the present disclosure as depicted in FIG. 6(a), is that intra-channel fiber nonlinearity is mitigated, thereby improving transmission performance as compared to a single-polarization signal, which all of the signals are located in the same polarization state as shown in FIG. 6(b).

As illustrated in Table 1, for a PolMod-QPSK signal the polarization state can be changed through a special bit mapping (block 205) wherein:

X-pol modulation: the inphase and quadrature of Y-pol is the same as X-polarization; and Y-pol modulation: the inphase and quadrature of Y-polarization is the inverse of those in X-polarization.

Figure 7:
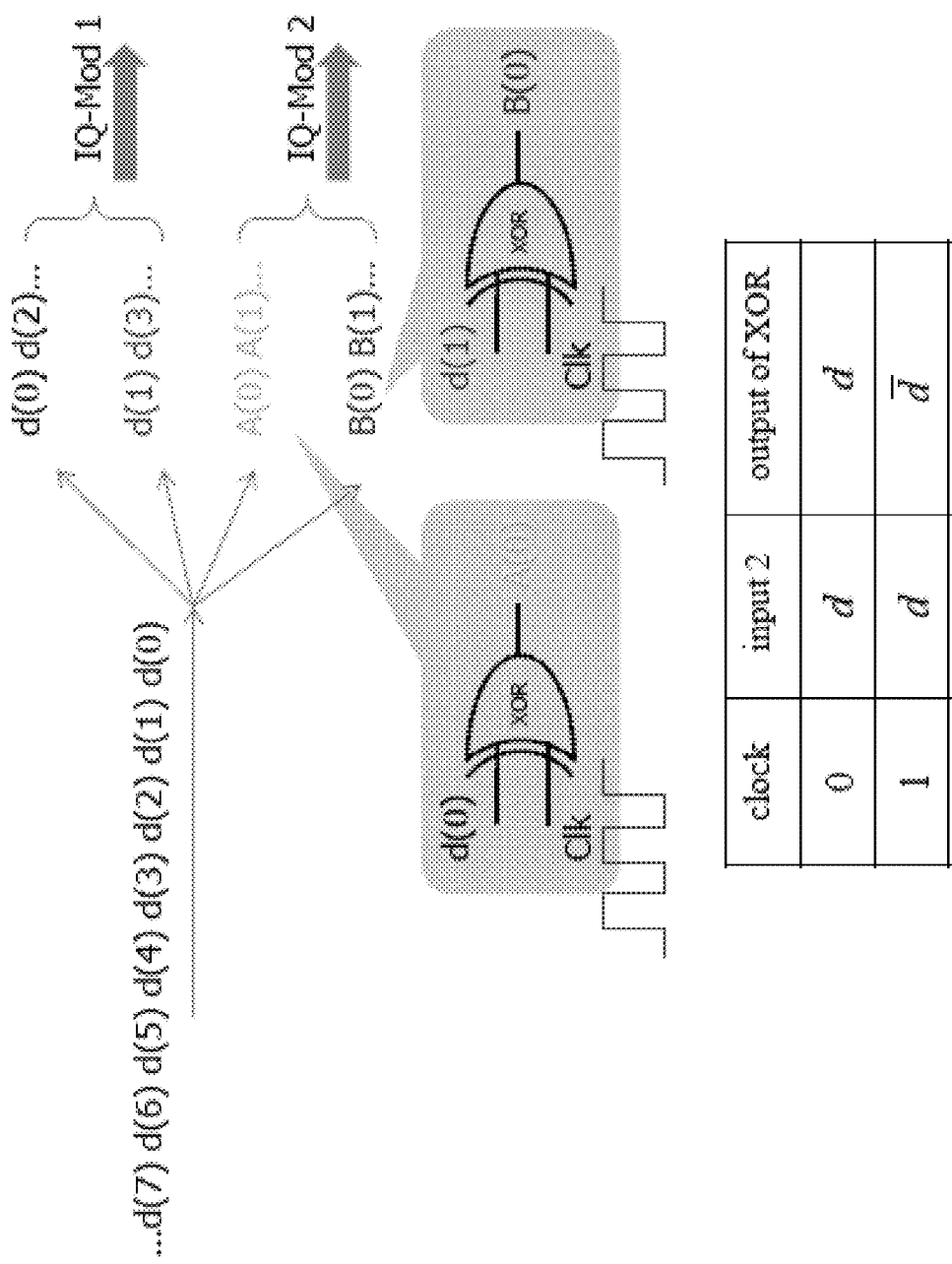
FIG. 7 depicts bit mapping 3 for PolSw-QPSK according to an aspect of the present disclosure.

As may now be appreciated, since the polarization alternation occurs every symbol, we may advantageously perform the XOR gate with the signal clock which also alternates every bit period, as shown in FIG. 7. With reference to that FIG. 7, therein is depicted a bit mapping 3 for PolSw-QPSK (block 105) according to aspects of the present disclosure. The outputs of the XOR gate connect to the IQ-mod2 (block 204) as the inphase and quadrature. Thus the polarization of the modulated QPSK signal will change alternatively similar to the clock. In the PolSw scheme, two user data are only used for producing each PolS symbol, thus delivering 2 Rs bit rate.

According to an aspect of the present disclosure, we are advantageously able to adaptively change the polarization scheme to PolMux, PolMod, or PolSw based on a particular system design and user request. Advantageously, the total bit rate is changeable, from 2 Rs to 4 Rs, enabling a very flexible transponder design.

Finally, and as noted previously with respect to the discussion of FIG. 1, after bit mapping the transmitted date are sent to drivers in block 106 for amplification and driving IQ modulators (blocks 203/204). Therein the electrical signals are converted to the optical domain. The optical signal originating from CW laser (block 201) is split by 2:1 splitter into x-polarization and y-polarization states that are modulated independently and subsequently re-combined to generate the QPSK signal exhibiting user-defined polarization scheme(s).

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method of generating variable bit-rate QPSK signals comprising the steps of:
   receiving user data;
   applying a bit mapping to the received data, wherein said bit mapping is one selected from the group consisting of polarization multiplexing (PolMux) bit mapping, polarization modulation (PolMod) bit mapping and polarization switched (PolSw) bit mapping;
   applying the bit mapped data to a pair of optical IQ modulators, wherein each one of the modulators is driven by a portion of a split optical signal; and
   combining the outputs of the IQ modulators through the effect of a polarization combiner such that an optical QPSK signal is output wherein the optical QPSK signal exhibits polarization characteristics according to the bit mapping applied;
wherein said output optical QPSK signal exhibits a bit rate selected from the group consisting of 4R, 3R, or 2R where R is a clock rate associated with a bit generator and wherein the inputs to both IQ modulators are configured such that the exclusive OR (XOR) of all the inputs equal 0.

2. The method of claim 1 wherein the bit rate 4R is associated with the PolMux bit mapping, the bit rate 3R is associated with the PolMod bit mapping and the bit rate 2R is associated with the PolSw bit mapping.

3. The method of claim 2 further comprising the step of:
   changing the output bit rate by changing the polarization bit mapping.

* * * * *